June 3, 1947.  C. H. M. THORPE  2,421,440
LINEAR MEASURING DEVICE
Filed March 18, 1943  2 Sheets-Sheet 1
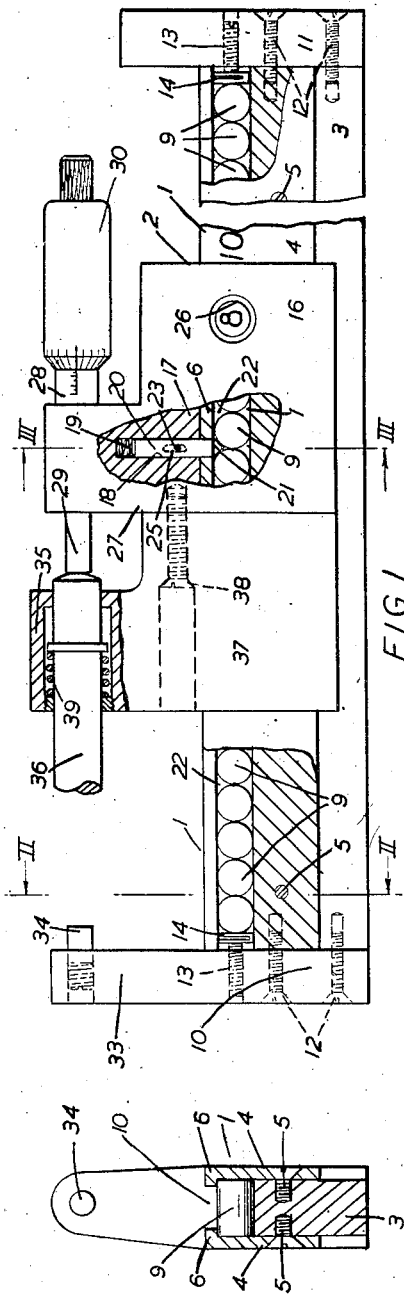
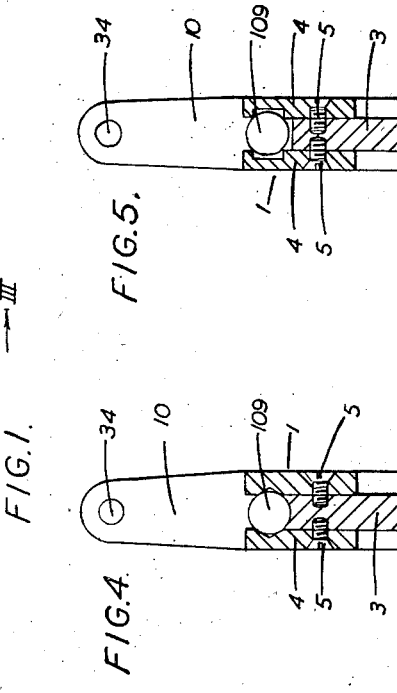
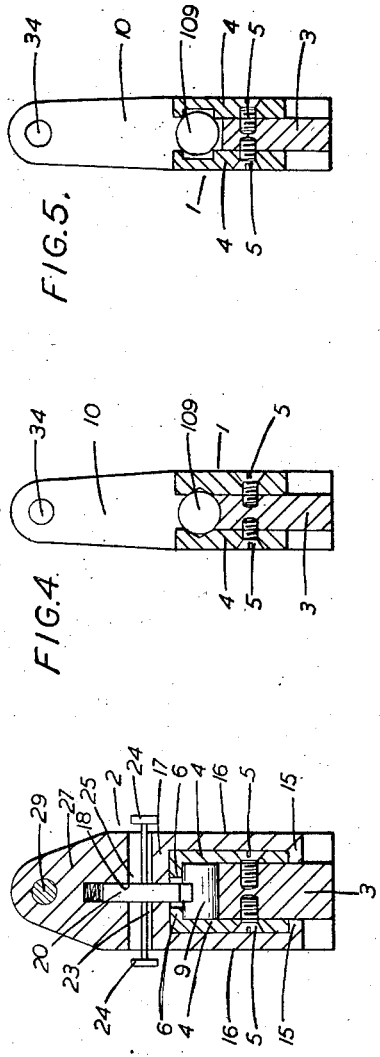
Christopher H. M. Thorpe
Inventor
By Stebbins and Blenko
his Attorneys

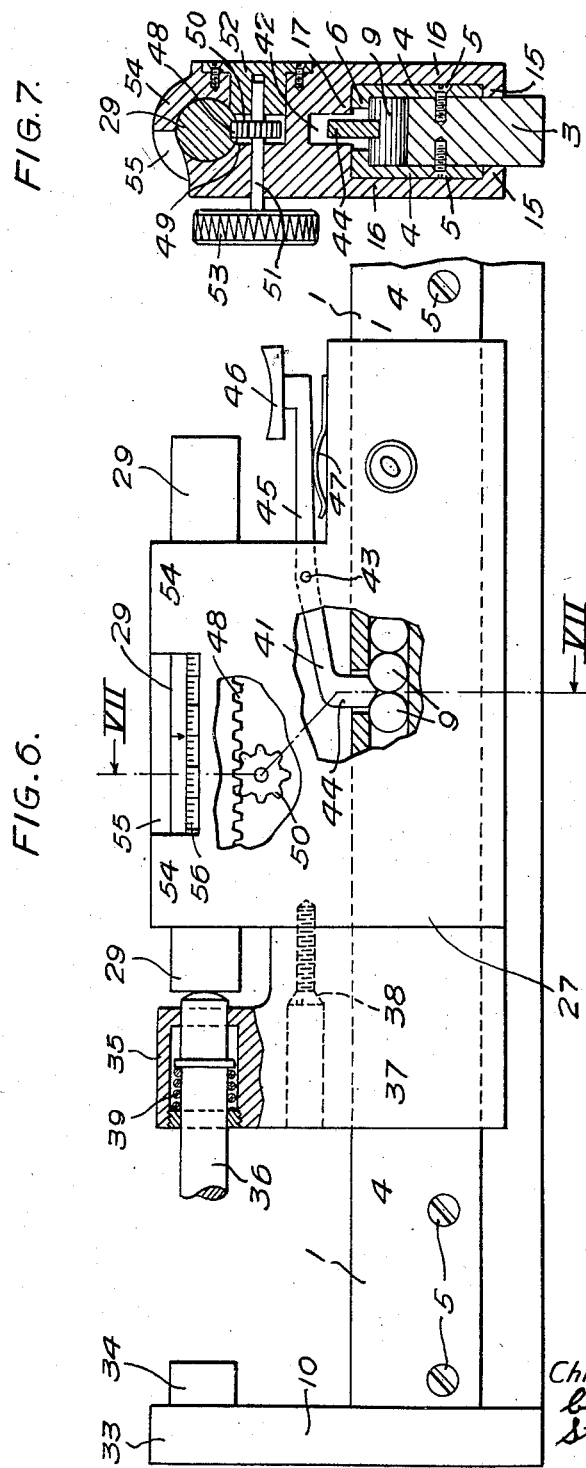

Patented June 3, 1947

2,421,440

UNITED STATES PATENT OFFICE 2,421,440

LINEAR MEASURING DEVICE

Christopher Henry Monson Thorpe, Huyton, England, assignor to British Insulated Cables Limited, Prescot, Lancashire, England, a British company Application March 18, 1943, Serial No. 479,575
In Great Britain April 11, 1942

3 Claims. (Cl. 33—165)

This invention is concerned with the means for adjusting the position of a part of an instrument or mechanism and has for its object the provision of a device by which a measured adjustment may be made quickly, but with great accuracy.

By the present invention I form such an adjusting device by providing the sliding carriage of a known kind of measuring device with a member for connecting with or acting upon the part of the instrument or mechanism of which the position is to be adjusted. The measuring device is of the kind comprising a scale, made up of a number of very closely similar circular members mounted in line in a trough or frame in contact with each other on their curved surfaces, along which scale the carriage, which carries a member movable relative to the carriage in a direction parallel with the direction of movement thereof by means of a fine adjustment device, is adapted to slide and to be located at any one of a number of positions along the length thereof by a retractile device which engages between two adjacent circular members of the scale. The member for connecting with or acting upon the instrument or mechanism to adjust the position thereof, with which in accordance with my invention I provide the carriage, is additional to the member movable by the fine adjustment device, is disposed coaxially with respect thereto and is maintained in contact therewith by spring force.

The very closely similar circular members may be cylinders or balls of the same diameter such as are used in bearings and the means for holding them comprise a trough or frame with an opening or openings to allow entry of the retractile device at any desired point along the length thereof. The retractile device for locating the part which moves over the scale may be a detent, such as a pawl or bolt, having a point, or truncated point, in the form of a wedge with flat or curved surfaces adapted to enter and make contact with the sides of the valley between two neighbouring circular members. Means may be provided for normally retaining the detent in engagement with the scale; for instance, it may be backed up by a spring or, in some cases, may be so placed and formed that it falls into position by its own weight. A positive lifting means may be provided for raising the detent out of engagement with the scale when the co-operating part is to be moved over the scale.

Very accurately formed and dimensioned hard steel rollers or balls are obtainable and are, as is known, adapted by their shape for lining up in a simple trough in such a way that the distance between the points of contact of neighbouring balls or rollers has a constant value within very close limits, of the order of one ten-thousandths of an inch. It should be understood that the term "cylinders or balls of the same diameter" when used herein means cylinders or balls of which the diameter is nominally the same and is actually equal to or approaches the nominal value within the very close limits indicated above. The trough will be of rectangular section where cylinders are used, and a rectangular form may also be adopted for the trough for balls, but a possible source of reduction of the degree of accuracy is eliminated if, when using balls, a trough with a V-grooved base, or a trough of triangular or equivalent section is used. Some means, such as a spring plunger, is provided to apply pressure to the line of cylinders or balls so as to maintain the members in contact.

The fine adjustment device may be a micrometer screw head or a rack-and-pinion device and the additional member may be housed in a part of the carriage carrying the first member operated by the fine adjustment device or in an auxiliary carriage secured to the main carriage. For some purposes, as for instance, in using the device to adjust an artificial high-frequency transmission line, it is essential that the additional member, acting as a connecting rod between the measuring head and the apparatus, should not rotate as the fine adjustment is made so as to avoid upsetting the characteristics of the line. Where the fine adjusting device is a micrometer screw it is, therefore, an advantage to round the end of the additional member in contact with it, so as to reduce the torque transmitted to the additional member to a negligible quantity.

The invention will be more fully described with the aid of the accompanying drawings which show, by way of example, several forms of the improved instrument-adjusting device. In these drawings, Figure 1 is a side elevation, partly in section, of one form of the device, Figure 2 is a cross-section, taken on the line II—II of Figure 1, of the device shown therein, Figure 3 is a cross-section, taken on the line III—III of Figure 1, of the device shown therein, Figures 4 and 5 are cross-sectional views corresponding to Figure 2 and showing modified forms of trough, Figure 6 is a side elevation, partly in section, of a second form of the improved measuring device, Figure 7 is a cross-section, taken on the line VII—VII in Figure 6, of the device shown therein.

Referring first of all to Figures 1, 2 and 3 of the drawings, it will be seen that the device comprises essentially a scale and a sliding carriage. The scale comprises a straight trough 1 built up of a flat rod 3, of which the upper edge (as seen in the drawings) forms the bottom wall, and a pair of strip-like members 4 secured to the sides of the rod by screws 5 and projecting beyond its upper edge to form the side walls of the trough. The upper edge of each strip has an inwardly turned lip 6, the two lips together serving to retain in the trough a number of hardened steel cylinders 9 having their axes extending at right angles to that of the trough. The trough is closed at both ends by end walls 10 and 11. The end wall 11 is detachably secured to the bottom wall 3 by screws 12 and carries a grub-screw 13 which serves as an adjustable abutment for the end cylinder 9, by means of which the cylinders may be held pressed together. The end wall 10 may also be detachable and be fitted with an adjustable abutment 13. It is advantageous to insert a compression spring 14 between one of the abutments and the neighbouring cylinder. Preferably this is done at the end remote from the zero end of the scale, but in some cases a spring may be inserted in a corresponding position at the zero end instead of, or, as is shown in Figure 1, as well as, at the other end.

The sliding carriage 2 which works on the trough 1 comprises a body portion which is in the form of an inverted channel with inwardly turned lips 15 on its sides 16 which extend underneath the lower edges of the plates 4 and retain the carriage on the trough, the carriage being threaded on the trough before one end wall thereof is positioned. Alternatively, the inwardly turned lips 15 on the carriage body may be made detachable. Within the upper wall 17 of the carriage is a cylindrical recess 18 extending upwards in a direction normal to the axis of the trough. This recess houses a compression spring 19 and a detent in the form of a plunger 20 the lower wedge shaped end 21 of which is pressed by the spring into one of the valleys 22 between neighbouring cylinders 9 so as to locate the carriage longitudinally with respect to the scale. To permit the plunger to be raised against the force of the spring to allow of the carriage being moved from one position to another through a number of accurately dimensioned steps constituted by the rolls 9, the plunger carries a transversely extending bar 23 with finger grips 24 which passes through a transverse slot 25 in the carriage wall. Numbers indicating the steps are engraved on one of the side plates 4 of the trough and the corresponding side of the carriage has an aperture 26 through which a number shows when the carriage is in one of the positions determined by the engagement of the end of the plunger 20 between two rolls. The carriage has an upward extension 27 in which is mounted a sleeve 28 within which slides a plunger 29, the sleeve and plunger being connected by a micrometer screw head 30 so that the adjusted position of the plunger relative to the carriage body may be made with great accuracy and read off on the usual micrometer scale provided.

A housing 35 is provided for a second plunger 36 in line with the first plunger 29. This housing 35 may be integral with the body of the carriage 2 which may be made sufficiently long for the purpose or it may be carried on an auxiliary carriage 37 which is secured to the main carriage, for instance, by screws 38. The plunger 36 extends through the housing and is connected with or arranged to act upon the part of the instrument to be adjusted in position. Within the housing is a spring 39 which holds the rounded end of the plunger 36 in contact with that of the plunger 29 so that without being rotated the plunger 36 is adjusted longitudinally of the trough by the micrometer head and by movement of the carriage along the trough.

Conveniently, the cylinders 9 have a diameter of one centimeter and the micrometer scale is graduated to read millimeters and fiftieths or hundredths of a millimeter. However, cylinders of any other convenient size, for instance, a simple fraction of an inch, may be employed and the micrometer may be scaled to read to the nearest one thousandth of an inch. In place of a row of cylinders, a row of balls 109 may be used, in which case the trough may have the form shown in Figure 4 or that shown in Figure 5.

In the device shown in Figures 6 and 7, the carriage is located by means of a spring backed pawl 41 instead of the spring pressed plunger 20 shown in Figures 1 and 2. This pawl is housed in a recess 42 in the under surface of the top of the carriage body and consists of an inclined portion which extends from the horizontal pivot pin 43 and runs into a vertical end piece with a wedge shaped end 44 adapted to enter the valley between two neighbouring cylinders 9. On the opposite side of the pivot point the pawl extends rearwardly to form an operating arm 45 on the end of which is a press button 46. A leaf spring 47 normally holds the pawl in engagement with the cylinders, so locating the carriage. By depressing the button 46 the pawl is raised clear of the cylinders and the carriage may be moved freely and rapidly along the trough. It will be apparent that this form of locator might be used with the carriage shown in Figures 1 and 2, instead of the spring pressed plunger 20.

The plunger 29 fitted to the carriage shown in Figures 6 and 7 carries on its under surface a longitudinally extending fine toothed rack 48. Housed in a recess 49 in the upward extension 27 carrying the plunger 29 is a pinion 50 which engages the rack and is carried on a spindle 51 housed in bearings in the opposite side walls of the recess 49. One of these walls, namely the wall 52, is removable to permit the pinion and its spindle to be introduced laterally. At the opposite side the spindle projects through the wall to carry a milled knob 53 by which the pinion can be rotated and the plunger 29 moved in one direction or the other. The central part of the plunger housing 54 is cut away as shown at 55 to expose a part of the plunger to view. A scale 56 is engraved on the surface of the housing 54 adjacent the exposed surface of the plunger 29, or on the plunger surface, so that an indication is given of the relative movement of the plunger and its housing. If desired the two parts may carry a vernier scale.

What I claim as my invention is:

1. A device for accurately adjusting a part of an instrument or mechanism, said device comprising a scale and a carriage movable along said scale, said scale comprising a series of bodies of circular cross-section of the same size, a trough housing said bodies, and means for maintaining them in line in said trough with their curved surfaces in contact with one another, and said carriage comprising a body portion of inverted channel section with a base wall and dependent side walls, which is a sliding fit on said trough, means comprising interengaging surfaces on said trough and said carriage for retaining said carriage on said trough, a spring-pressed detent housed in a recess in said body and engaging between the underlying two of said circular members and locating said carriage with respect to said trough, means for retracting said detent to permit movement of said carriage relative to said trough, an upward extension on said carriage body having a surface extending parallel to said trough, a member in sliding engagement with said surface and means for propelling said member over the last said surface in a direction extending parallel with said trough, means for measuring the relative movement between said sliding member and said carriage, means for acting upon the part of the instrument or mechanism of which the position is to be adjusted, the last said means comprising a second movable member movable with respect to said carriage and in a direction parallel to said trough by the said sliding member, and a spring for pressing together the adjacent ends of the sliding member and the second movable member, whereby to maintain them in contact.

2. A device for accurately adjusting a part of an instrument or mechanism, said device comprising a scale and a carriage movable along said scale, said scale comprising a series of bodies of circular cross-section having the same diameter, a trough comprising a bottom wall, a pair of side walls with inwardly turned lips thereon and a pair of end walls, for housing said bodies in line, and an adjustable abutment on one of said end walls for pressing the bodies together on their circular surfaces, and said carriage comprising a body portion of inverted channel section with a base wall and dependent side walls, which is a sliding fit on said trough, inwardly turned lips on said side walls which extend under surfaces on said trough and retain said carriage thereon, a spring-pressed detent housed in a recess in said body, engaging between the underlying two of said circular members and locating said carriage with respect to said trough, means for releasing said detent from engagement with said circular members, an upward extension on said carriage body portion having a recess extending in a direction parallel to the axis of said trough, a plunger slidable within said recess, means for accurately adjusting the position of said plunger in said recess, means for measuring the displacement of said plunger relative to said carriage, means for acting upon the part of the instrument or mechanism of which the position is to be adjusted, the last said means comprising a second plunger coaxial with the first plunger and movable in an axial direction with respect to said carriage by the first plunger and a spring for pressing together the adjacent ends of the two plungers, whereby to maintain them in contact.

3. In a device for accurately adjusting a part of an instrument or mechanism of the kind comprising a scale built up of a number of very closely similar circular members held in line in contact with each other on their curved surfaces, a carriage slidable on the scale, a retractile device for engaging between two adjacent circular members of said scale, a pair of members mounted on said carriage and movable with respect thereto in a direction parallel to said scale and manually operable means providing for a fine adjustment of said movable members, the improvement consisting in means mechanically coupling one of the two movable members with said manually operable means for direct adjustment thereby, the other of the movable members being a plunger spring-pressed into contact with and adjustable by the first movable member.

CHRISTOPHER HENRY MONSON THORPE.

REFERENCES CITED

The following references are of record in the file of this patent:

UNITED STATES PATENTS

| Number | Name | Date |
|---|---|---|
| 2,144,972 | Hirst | Jan. 24, 1939 |